United States Patent
Ott

(10) Patent No.: US 6,390,431 B1
(45) Date of Patent: May 21, 2002

(54) BEVERAGE CUP HOLDER FOR ATTACHMENT TO A WHEELED SUITCASE

(76) Inventor: Gail F. Ott, 7220 Brooking Way, Mechanicsville, VA (US) 23111

( * ) Notice: Subject to any disclaimer, the term of this patent is extended or adjusted under 35 U.S.C. 154(b) by 0 days.

(21) Appl. No.: 09/640,510

(22) Filed: Aug. 17, 2000

(51) Int. Cl.⁷ .................................................. A47K 1/08
(52) U.S. Cl. ............................... 248/311.2; 248/229.23; 248/231.51
(58) Field of Search .................. 248/102, 103, 248/104, 105, 106, 107, 311.2, 230.4, 231.51, 229.13, 229.23; 224/407, 926; 294/31.2; 220/738; D12/411

(56) References Cited

U.S. PATENT DOCUMENTS

| | | | | |
|---|---|---|---|---|
| 2,051,722 A | * | 8/1936 | Koch | 248/103 |
| 2,912,205 A | * | 11/1959 | Toune | 248/311.2 |
| 3,533,590 A | * | 10/1970 | Swire | 248/311.2 |
| 4,117,933 A | | 10/1978 | Lachance | 206/583 |
| 4,535,923 A | * | 8/1985 | Manke | 224/926 |
| 4,550,930 A | | 11/1985 | Proffit | 280/655 |
| 5,014,956 A | * | 5/1991 | Kayali | 248/311.2 |
| 5,676,296 A | | 10/1997 | Masters | 224/653 |
| 5,704,671 A | | 1/1998 | van der Wal et al. | 294/31.2 |
| 5,853,158 A | * | 12/1998 | Riggle | 248/311.2 |
| 5,971,409 A | | 10/1999 | Butz | 280/47.26 |
| 5,996,957 A | * | 12/1999 | Kurtz | 248/311.2 |
| 6,092,776 A | * | 7/2000 | You | 248/311.2 |
| 6,189,542 B1 | * | 2/2001 | Shepard | 132/273 |

* cited by examiner

Primary Examiner—Leslie A. Braun
Assistant Examiner—Gwendolyn Baxter
(74) Attorney, Agent, or Firm—Norman Rainer

(57) ABSTRACT

A device for removably holding a beverage container in upright position upon a telescoping upright handle of a wheeled luggage unit includes a confining structure configured to slidably receive, and secure by gravity effect a beverage container having a substantially circular exterior profile. The confining structure has a retaining sidewall and a bottom member. Opposed jaws, associated with the sidewall, are urged together by springs, and are adapted to embrace the handle of the luggage unit. A gripping material is disposed on the jaws to prevent slipping of the jaws in their embrace of the handle.

2 Claims, 2 Drawing Sheets

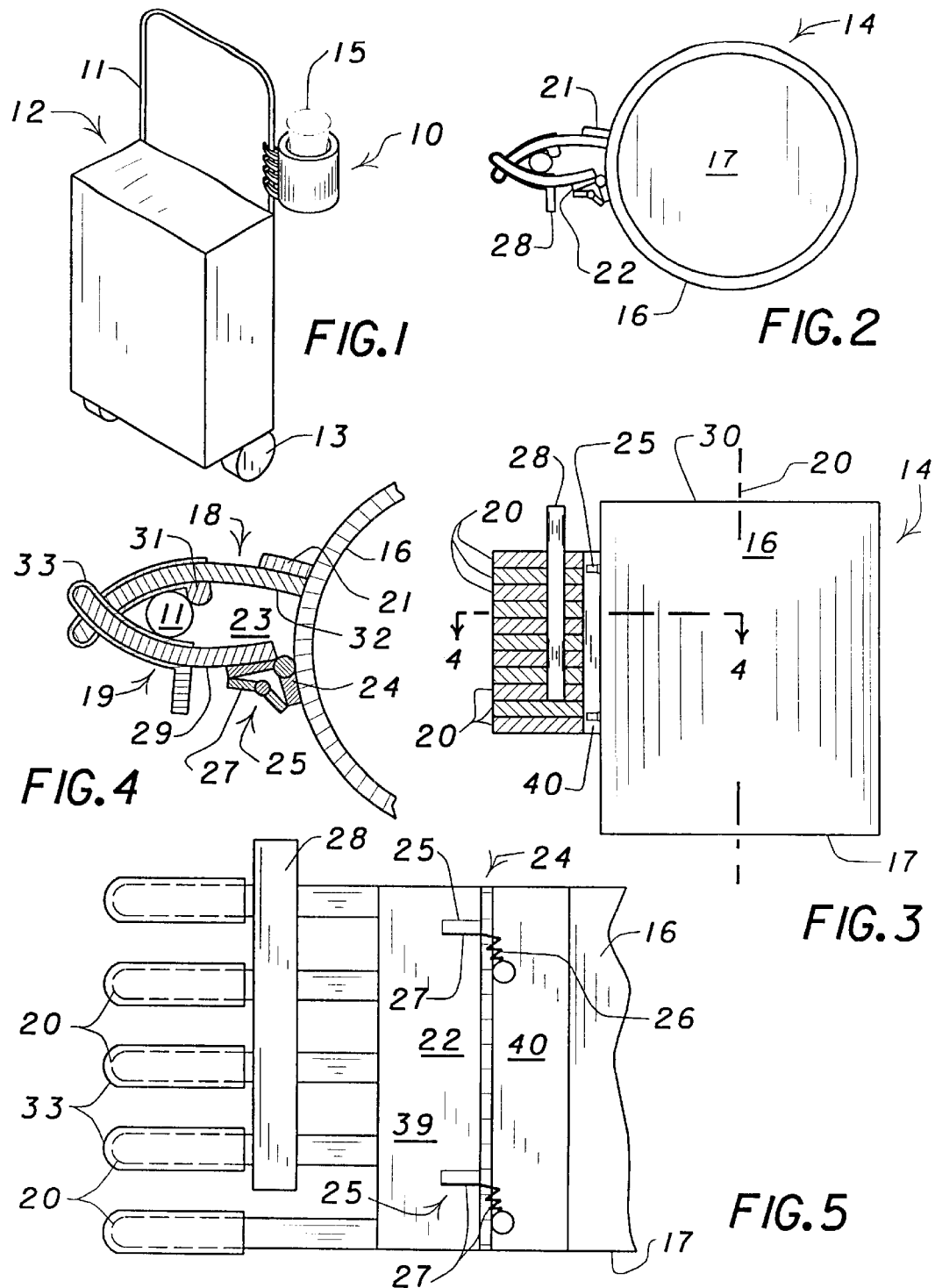

BEVERAGE CUP HOLDER FOR ATTACHMENT TO A WHEELED SUITCASE

BACKGROUND OF THE INVENTION

1. Field of the Invention

This invention relates to a holder for a beverage cup, and more particularly concerns a beverage cup holder for use by travelers using wheeled luggage.

2. Description of the Prior Art

In travel situations such as in airports, the walking traveler is generally carrying a purse, suitcase, briefcase, packages, or other items of luggage or personal belongings. When just one hand is used to carry such items, the other hand can be used to carry a beverage container such as a cup of coffee, a soft drink can, or the like. However, when both hands are thus occupied, it becomes extremely difficult to do simple tasks such as open doors, search for a passport within a wallet or purse, or hand travel documents to requesting personnel.

Devices have earlier been disclosed to facilitate the hands-free carrying of a beverage in conjunction with luggage. For example, U.S. Pat. No. 5,704,671 concerns a holder for a beverage cup wherein said holder is adapted to embrace the handle of a suitcase, thereby enabling the user to hold the suitcase and beverage cup with a single hand.

Luggage items equipped with wheels are in widespread use, particularly in airports where the traveler must often walk considerable distances on smooth-surfaced walkways. Such wheeled luggage items are generally equipped with an upwardly telescoping handle which facilitates pulling of the luggage. It is known to dispose pockets upon the exterior sidewalls of the storage compartment of wheeled luggage items, and such pockets could conceivably be employed to carry beverage cups in an upright position. However, the side pockets widen the lateral profile of the luggage, and this may engender difficulty in passage through narrow aircraft aisles. Although a beverage cup removably secured to the handle of a wheeled luggage item would place the cup at a convenient elevation for the user, any modification of the handle might impair its telescoping functionality.

It is accordingly an object of the present invention to provide a device for holding a beverage container in removable association with the telescoping upright handle of a wheeled luggage unit.

It is another object of this invention to provide a device as in the foregoing object which does not impair the telescoping functionality of said handle.

It is a further object of the present invention to provide a device of the aforesaid nature of durable, simple construction amenable to low cost manufacture.

These objects and other objects and advantages of the invention will be apparent from the following description.

SUMMARY OF THE INVENTION

The above and other beneficial objects and advantages are accomplished in accordance with the present invention by a device for removably holding a beverage container in upright position upon a telescoping upright handle of a wheeled luggage unit, said device comprising:

a) a confining structure configured so as to slidably receive, and secure by gravity effect a beverage container having a substantially circular exterior profile, said confining structure having sidewall retaining means, a bottom member, and a center axis of elongation, b) opposed jaws, associated with said sidewall retaining means and spring-biased to move together in a path orthogonal to said axis of elongation , and c) gripping means associated with said jaws and adapted to establish non-slipping contact with said upright handle.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a perspective view of a first embodiment of the beverage holder device of the present invention shown in functional relationship I the upright handle of a wheeled luggage unit.

FIG. 2 is a top view of the embodiment of FIG. 1.

FIG. 3 side view of the embodiment of FIG. 1.

FIG. 4 is an enlarged fragmentary sectional view taken in the direction of the arrows upon the line 4—4 of FIG. 3.

FIG. 5 is enlarged fragmentary side view.

DESCRIPTION OF THE PREFERRED EMBODIMENT

Figure 6:
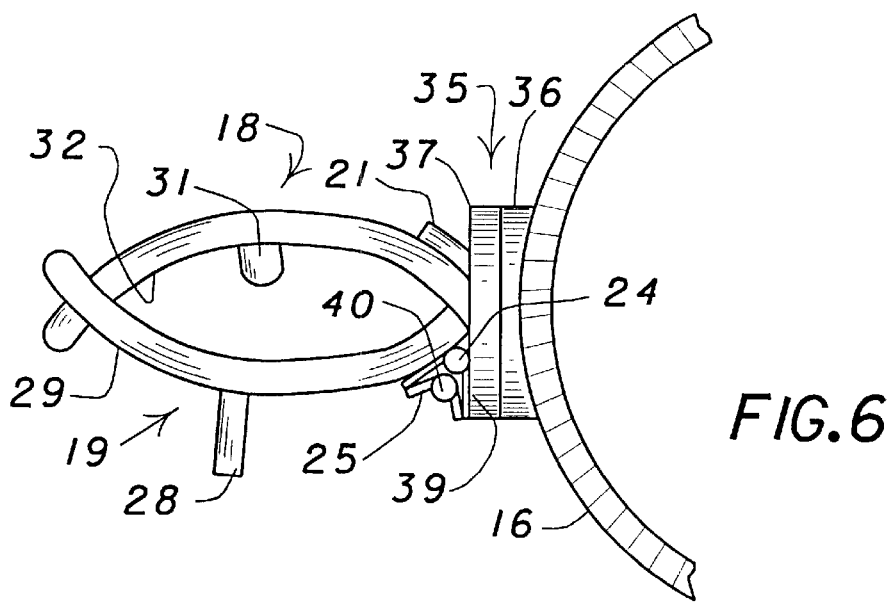
FIG. 6 is enlarged fragmentary top view of a second embodiment of rage holder of this invention.

Referring now to FIGS. 1–5, an embodiment of the beverage container holding device 10 of the present invention is shown secured to the telescoping upright handle 11 of a luggage unit 12 having wheels 13.

Holding device 10 includes a confining structure 14 configured so as to slideably receive a beverage container 15. In the exemplified embodiment, the confining structure 14 is shown comprised of a circular cylindrical sidewall 16 elongated upon a center axis 20, and a bottom panel 17, upon which container 15 is seated. In other embodiments., the functionality of the sidewall and bottom panel may be accomplished by a wire frame construction. In further embodiments, sidewall 16 might be comprised in part of an elasticized band. In a still further embodiment, sidewall 16 may be provided with a vertical slot which accommodates the handle of a coffee cup. The holding device may have a collapsible structure which occupies little space in a collapsed, storage state.

Opposed first and second jaws 18 and 19, respectively, are attached to sidewall 16. In the embodiment exemplified in FIGS. 1–5, each jaw is comprised of a number of separate fingers 20 emergent from elongated base panels 21 and 22 associated with said first and second jaws, respectively. The fingers are spaced apart and configured to enmesh with the corresponding fingers of the opposing jaw in comb-like manner. The number of said interengaging fingers may range from about 8 to 20. Said fingers are curved in a manner as to have facing concave contours which define a gripping region 23 when said jaws are brought together with attendant interengagement of said fingers.

In the embodiment of FIGS. 1–5, first jaw 18 is fixedly secured along base panel 21 to sidewall 16, and second jaw 19 is pivotally secured to sidewall 16 by means of elongated piano hinge 24 interactive with base panel 22, which may be a component of said hinge. Said hinge is comprised of facing parallel first and second strips 39 and 40, respectively. First strip 39 serves to secure the several fingers of the second jaw, and second strip 40 attaches to the sidewall 16 of confining structure 14.

Spring means in the form of two spaced apart twist-type springs 25 are interactive with said hinge. Said twist-type springs are fabricated from a single length of spring wire, and have one or more circular turns 26 and straight legs 27 tangentially emergent from the opposite extremities of said turns. As best shown in FIG. 5, each spring is attached at one leg to hinge 24 attached to sidewall 16. The opposite leg of each spring bears against base panel 22 or the first strip 39 of hinge 24 attached to said fingers, thereby urging the moveable second jaw 19 toward the stationary first jaw 18. More than two of said springs may be employed in said manner of function.

Control means in the form of bar 28 is secured to the exterior 29 of second jaw 19 and extends upwardly toward the upper extremity 30 of confining structure 14. Said control bar enables the user to hold the device by said upper extremity and, with the thumb of the same hand, to force said second jaw away from engagement with first jaw 18. Other means may, however be employed to facilitate movement of said second jaw away from said first jaw, thereby permitting clamping-type installation of the device upon the handle 11 of luggage unit 12.

An abutment protrusion 31 is disposed upon the interior surface 32 of first jaw 18. The function of said protrusion is to cause handle 11 to become secured between the two interengaged jaws.

Gripping means in the form of a layer of soft polymer 33 is disposed upon the fingers of both jaws. Said soft polymer preferably has a Shore A Durometer hardness in the range of 20–50, and preferably has a thickness between about 0.5 and 2 millimeters. Suitable polymer includes plasticized polyvinyl chloride, silicone and polyurethane. Said gripping means may be applied to said fingers either as a coating or as sleeves which fit onto the fingers. The function of said gripping means is to establish a sufficiently strong frictional grip upon handle 11 to prevent downward sliding of the device.

Figure 7:
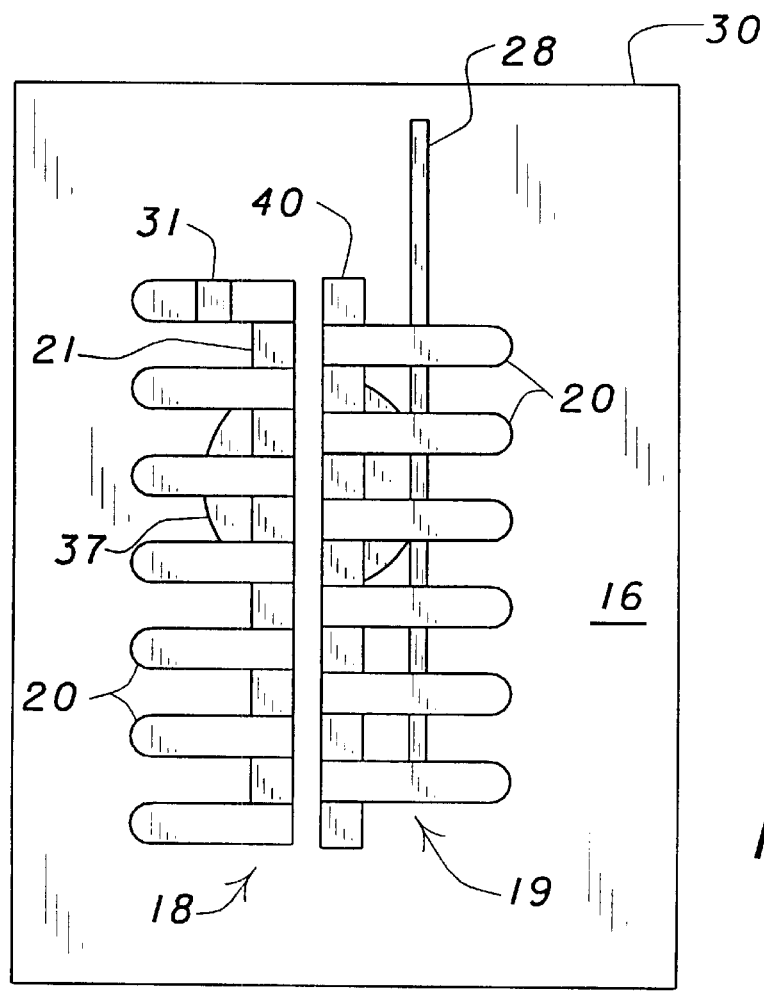
FIG. 7 is a front side view of the embodiment of FIG. 6 shown with the jaws held apart.

In the second embodiment of the beverage holding device of the present invention, as shown in FIGS. 6 and 7, pivot means 35 are interposed between sidewall 16 of the confining structure, and the opposed jaws. Said pivot means is comprised of inner and outer frictionally interactive discs 36 and 37, respectively, wherein inner disc 36 is affixed to sidewall 16, and outer disc 37 is adapted to slideably rotate with some frictional force upon said inner disc. First jaw 18 is attached by way of base panel 21 to said outer disc, and second jaw 19 is attached by way of hinge 24 to said outer disc in parallel opposition to base panel 21 of said first jaw. Springs 25 are interactive between the first and second strips 39 and 40, of hinge 24. By virtue of such construction, confining structure 14 can be rotated so as to have a vertical disposition when affixed to the elongated handle of a wheeled luggage item.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A device for removably holding a beverage container in upright position upon a telescoping upright handle of a wheeled luggage unit, said device comprising:

a) a confining structure configured to slidably receive, and secure by gravity effect a beverage container having a substantially circular exterior profile, said confining structure having sidewall retaining means, a bottom member, and a center axis of elongation, b) opposed first and second jaws associated with said sidewall retaining means, each jaw comprised of a number of separate fingers, and spring means urging said jaws together in a path orthogonal to said axis of elongation, said second jaw being biased by said spring means to move toward and together with said first jaw which remains stationary during such movement, c) control means secured to said second jaw to enable said second jaw to be forced away from said first jaw against the urging of said spring means, and d) gripping means associated with said jaws to establish non-slipping contact with said upright handle.

2. A device for removably holding a beverage container in upright position upon a telescoping upright handle of a wheeled luggage unit, said device comprising:

a) a confining structure configured to slidably receive, and secure by gravity effect a beverage container having a substantially circular exterior profile, said confining structure having sidewall retaining means, a bottom member, and a center axis of elongation, b) opposed first and second jaws associated with said sidewall retaining means, each jaw comprised of a number of separate fingers configured and spaced apart so as to enmesh where said jaws are moved together, said fingers being curved in a manner so as to have facing concave contours which define a gripping region when said jaws are brought together with attendant enmeshing of said fingers, and spring means urging said jaws together in a path orthogonal to said axis of elongation, c) gripping means associated with said jaws to establish non-slipping contact with said upright handle, and d) an abutment protrusion disposed upon fingers of one of said jaws within said gripping region.

\* \* \* \* \*